United States Patent [19]

Bauer et al.

[11] Patent Number: 5,819,047

[45] Date of Patent: Oct. 6, 1998

[54] METHOD FOR CONTROLLING RESOURCE USAGE BY NETWORK IDENTITIES

[75] Inventors: Eric Jonathan Bauer, Freehold; Russel W. Schaffer, Ocean Grove, both of N.J.

[73] Assignee: AT&T Corp, Middletown, N.J.

[21] Appl. No.: 706,370

[22] Filed: Aug. 30, 1996

[51] Int. Cl.⁶ .................................................. G06F 15/16
[52] U.S. Cl. .............................. 395/200.59; 395/200.47
[58] Field of Search ..................... 395/200.59, 200.31, 395/200.47, 200.48, 200.49; 707/10

[56] References Cited

U.S. PATENT DOCUMENTS

| | | | |
|---|---|---|---|
| 5,421,011 | 5/1995 | Camillone et al. | 395/650 |
| 5,446,737 | 8/1995 | Cidon et al. | 370/85.5 |
| 5,477,530 | 12/1995 | Ahmadi et al. | 370/16.1 |
| 5,572,526 | 11/1996 | Cidon et al. | 370/85.5 |
| 5,713,013 | 1/1998 | Black | 395/602 |

FOREIGN PATENT DOCUMENTS 0 413 490 A2  2/1991  European Pat. Off. ....... H04Q 11/04
0 666 665 A2  8/1995  European Pat. Off. ........ H04L 12/24

OTHER PUBLICATIONS

A. Bettison et al., "Limits—A System for UNIX Resource Adminstration," Proceedings of the Supercomputing Conference, Reno, Nov. 13–17, 1989, No. Conf. 2, Nov. 13, 1989, Institute of Electrical and Electronics Engineers, pp. 686–692.

*Primary Examiner*—Mehmet B. Geckil

[57] ABSTRACT

A method for authorizing the allocation of a resource of a computing system to a user on a network-wide basis using network-wide quotas. When a resource consumption request is received by an authority, a network-wide maximum-use quota amount of the resource that is associated with the user is compared to a network-wide resource amount that is in-use by the user. The requested amount of the resource is allocated on a network-wide basis based on when the requested amount of the resource and the network-wide resource amount in-use by the user together do not exceed the network-wide maximum-use quota amount of the resource associated with the user.

27 Claims, 4 Drawing Sheets

FIG. 3

```
typedef struct _USER_RECORD {
    unsigned long UserId;
    char UserName[64];
    amar UserDescription[64];
    char UserPassword[14];
    time_t PasswordExpirationDate;
    time_t AccountExpirationDate;
    unsigned long FileSpaceQuotaTotal;   // new field
    unsigned long FileSpaceQuotaUsed;    // new field
    unsigned long PrintPageQuotaTotal;   // new field
    unsigned long PrintPageQuotaUsed;    // new field
} USER_RECORD;
```
30

FIG. 4

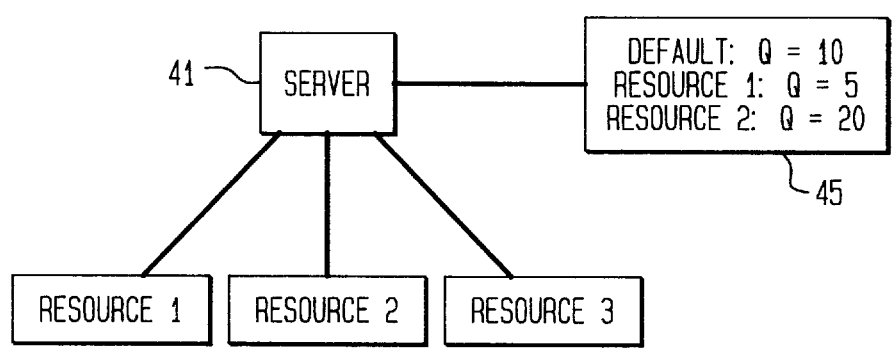

METHOD FOR CONTROLLING RESOURCE USAGE BY NETWORK IDENTITIES

BACKGOUND OF THE INVENTION

1. Field of the Invention

The present invention relates to the field of computer systems. More particularly, the present invention relates to a method and for controlling usage of resources provided by a networked computing system.

2. Description of the Related Art

A local area network (LAN) allows workstations and personal computers (PCs) to share resources, such as files and printers, that are distributed around the LAN. This type of network is generally referred to as a client/server system or network because requests from the "client" workstations and PCs are processed by a host "server".

FIG. 1 shows a schematic block diagram of an illustrative computing system 10 configured as a conventional client/server system. The network includes a server computer 11 that is connected to a plurality of client personal computers (PCs) 12 and printers 13 via LAN 14. Server computer 11 provides the client Pcs 12 with shared access to data stored on hard disk 15.

Network operating systems are increasingly using "networkwide" user identities in which a "network user", such as John Smith, is given a single network-wide identity that is used for uniquely identifying the user anywhere in the network, thus simplifying administrative and other related tasks regardless of network topology or organization. Traditional operating systems maintain locally-meaningful user identifiers, such as UNIX numeric "user identifiers" or "uids", for tracking local resource ownership, access controls, and usage. Advanced Network Operating System products, such the Advanced Server for UNIX Systems (AS/U) network operating system, maintain mappings between "network-wide" user identities and the particular locally-meaningful user identities on each of the computers in the network.

Consider the example of a university computer system having limited resources and which is used by a large number of users. It is necessary to limit the resources that any particular user may consume so that the system availability is maximized in some sense. One approach for limiting consumption of resources might be for the system administrators to adopt a policy of assigning each student a resource quota of 100 MB of disk space. Even though the system may have many gigabytes of disk space, no individual student is permitted to store more than their quota limit of 100 MB. In conventional systems, quotas such as these are configured and enforced on a per-machine basis.

For conventional systems like those shown in FIG. 1, the concept of quotas is quite useful. However, with evolutions in networked computing, the details of where particular resources are physically hosted have become obscured, that is, the location of the particular server computer offering access to a particular file system or printer is usually not clear to a user. FIG. 2 shows a schematic block diagram of an illustrative computing system 20 providing networked computing. System 20 includes a plurality of server computers 21a–21c connected to a plurality of PCs 22a and a plurality of printers 23a via LAN 24a. Server computers 21a–21c each provide shared access to data stored on hard disks 25a–25c, respectively. System 20 also includes server computer 21d connected to a plurality of PCs 22d and a plurality of printers 23d via LAN 24d. Server computer 21d provides shared access to data stored on hard disk 25d. LAN 24d is connected to LAN 24a through gateway 26d. Another LAN 24e connects a plurality of server computers 21e and 21f to a plurality of PCs 22e and a printer 23e. Like the other server computers, server computer 21e provides shared access to data stored on hard disk 25e. LAN 24e is connected to LAN 24a through gateway 26e.

While networked computing obscures details of the location of a resource, users are provided with the advantage of a simpler, more useful view of the network. At the same time, machine-based quota limitations like those used with conventional systems (FIG. 1) are awkward on systems like those shown in FIG. 2. For instance, imagine that the university computer system described above is now organized as 10 server computers each having 50 Gigabytes of disk storage. FIG. 2 conceptionally shows part of such an exemplary system. The university policy dictates that each student will be granted no more than 100 MB total storage on all of the university's computers. A conventional solution to this problem is to allocate storage quotas for each respective student onto a particular server or servers. For example, a storage quota for a given student may be apportioned with 70 MB on a first server and 30 MB on a second server, with the student being prohibited from storing files on any of the other 8 servers of the system. This particular approach corresponds to the concept of a network home directory for a network user. A problem with this approach is that it severely restricts the ability of a network user to work on files on multiple computers. Further, as computer configurations are changed, an administrator must explicitly reallocate each student's quota appropriately among the different server computers.

Another approach for limiting total storage use on the 10 server system by a network user is to grant the network user the same storage quota on all computer systems on which the network user has access. For example, if a network user is allocated Q megabytes of disk storage on each computer system of the network, and has access to X computer systems, then the network user is permitted to use at most XxQ megabytes of disk storage on the network as a whole. This approach has an advantage of eliminating the need for the network administrator to allocate users among servers. However, where the number of computers X is large, the limit on disk space per server must be set so low that any particular system may become nearly useless for a particular network user. If Q is made sufficiently large so that the allocated disk space per computer system is useful, then XxQ may be larger than the total disk space that any one network user is permitted to use in accordance with the university's storage policy.

What is needed is a simplified way to control usage of resources provided by networked computing systems,

SUMMARY OF THE INVENTION

The present invention provides a simplified way of controlling usage of resources of a networked computing system so that network users do not exceed assigned consumption quotas.

Advantageously, the present invention provides a method for authorizing the allocation of resources of a computing system to a user on a network-wide basis using network-wide quotas. When a resource consumption request is received by a computer system configured with this invention, a network-wide maximum-use quota amount of the resource that is associated with the user is compared to a network-wide resource amount that is in-use by the user.

The user is authorized to use the requested amount of the resource when the requested amount of the resource and the total amount of this resource that is in use by this user on the network do not exceed the network-wide maximum-use quota amount of the resource for this user.

BRIEF DESCRIPTION OF THE DRAWING

The present invention is illustrated by way of example and not limitation in the accompanying figures in which like reference numerals indicate similar elements and in which:

FIG. 3 shows an exemplary structure of how a user account may be stored in an accounts database including network-wide quotas according to the present invention;

FIG. 4 shows a schematic block diagram illustrating an exemplary default per-system quota for a resource type and exemplary resource-specific quota according to the present invention;

DETAILED DESCRIPTION

Figure 1:
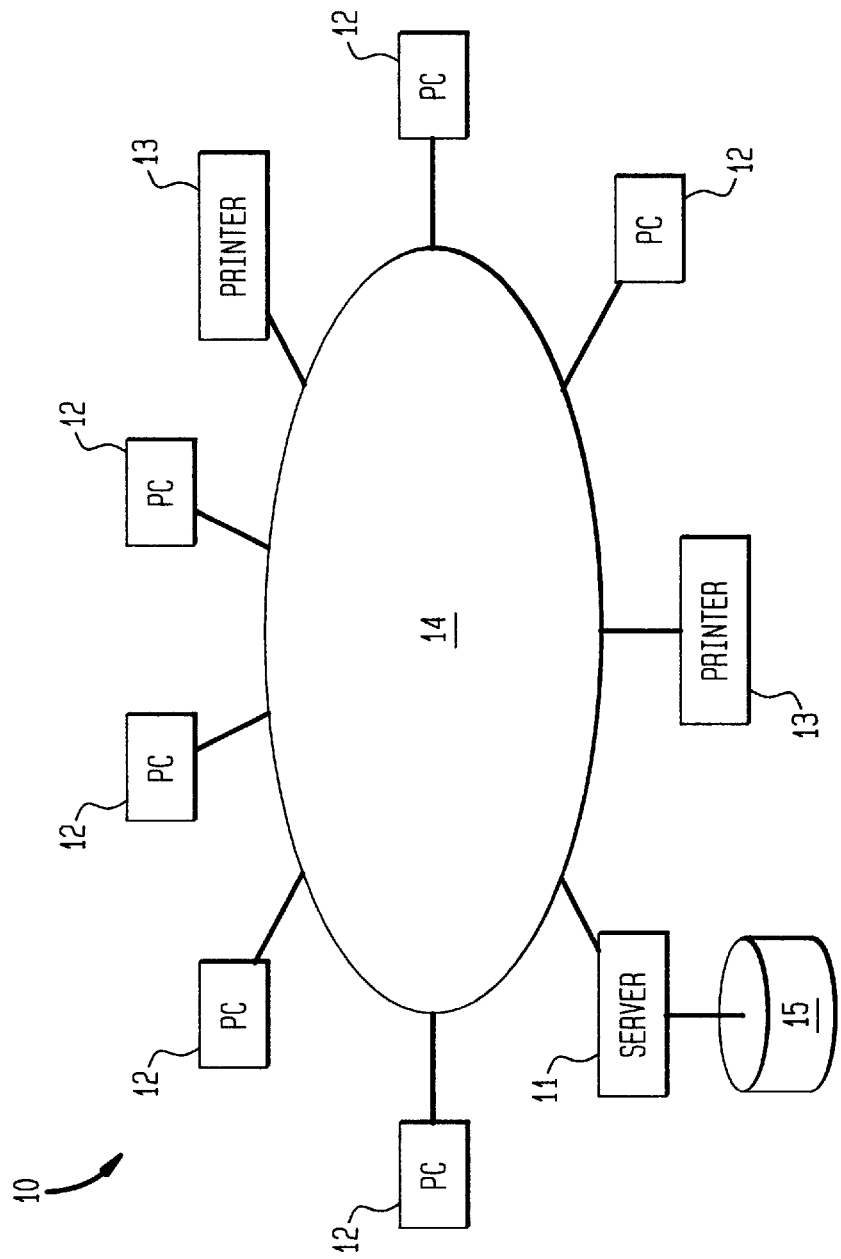
FIG. 1 shows a schematic block diagram of an illustrative LAN configured as a conventional client/server system.

The present invention assigns network-wide resource quotas to each network user for controlling resource usage on a network as a whole. According to the invention, the same authority that defines individual network identities for the network as a whole maintains the network-wide quotas for each network identity. For example, in the Advanced Server for UNIX Systems (AS/U) network operating system, network user accounts are maintained in an accounts database. This accounts database is both distributed and replicated. According to the present invention, information relating to each user's network-wide quotas limiting the total use or consumption of network resources by the user are also maintained in the accounts database. Specifically, each account in the accounts database maintains the network-wide quota limits for a particular network identity, as well as information relating to the quantities of resources consumed by the network identity. FIG. 3 shows an exemplary structure of how a user account may be stored in an accounts database 30 using network-wide quotas.

A set of multiple independent network-wide quotas can be created and maintained for different resource types or classes, such as a disk storage quota and a printer page-count quota, for each network identity. Similarly, different classes of network identities can be assigned different sets of network-wide quotas. For example, undergraduate students at a university may be assigned one level of network-wide quotas, graduate students may be assigned a higher level of network-wide quotas, and professors may be assigned an even higher, perhaps unlimited, level of network-wide quota. Of course, a system administrator may have authority for adjusting individual network-wide quotas for a network identity regardless of the class of the network identity.

Network-wide quotas may be assigned as fixed block-type quotas or as an allowance-type quota. A network-wide quota that assigns 100 MB of disk space to a network identity is an example of a fixed block-type quota. A network-wide quota that permits the printing of twenty pages a week is an example of an allowance-type quota. Resources that are controlled by network-wide quotas may be either renewable or non-renewable. Disk space is an example of a renewable resource because a depleted network-wide quota for storage space may be renewed by deleting files. Printed pages are an example of a non-renewable resource, that is, once a page has been printed, it cannot be unprinted.

Network-wide quotas can also work in conjunction with per-system quotas and resource-specific quota. One policy for interaction between the various quotas is for the controlling quota for the network identity to be the minimum of the network-wide quota for the network identity and any relevant per-system or resource-specific quota. For example, a student who has been granted a total of ten hours of CPU time on a university's networked computers may be prohibited by a policy associated with the university's supercomputer from consuming more than one of those ten hours on the supercomputer.

FIG. 4 shows a schematic block diagram illustrating an exemplary default per-system quota and exemplary resource-specific quotas 45 according to the present invention. In FIG. 4, these quotas 45 are accessed by server 41. Quota 45 indicates that a default quota for a particular class of resource is set to 10 units, while the resource-specific quota for resource 1 is 5 units, and the resource-specific quota for resource 2 is 20 units. The default quota of 10 units applies to resource 3.

The types of resources that may be controlled by network-wide quotas are not limited to disk usage or printer usage. Other examples of resources are virtual memory usage, network transmissions, mail messages sent, etc.

For a particular network identity i and a particular class of resource r, a network-wide quota q(i,r) is assigned to network identity i and stored in the accounts database. For a particular computer c, c(i,r) denotes the total usage of resource r by network identity i on computer c. So, if N is the entire set of networked computers to which the network identity i has access, then the network-wide quotas are enforced according to the following inequality:

$$\sum_{c \in n} c(i, r) \leq q(i, r).$$

When a network identity attempts to consume a resource on a particular computer, the operating system on that computer contacts an authority (such as an AS/U server) for determining whether the network-wide quotas assigned to the network identity permit the network identity to consume the resources in question. If network-wide quotas are checked at the time a network identity is authenticated, such as at the time the network identity logs on to the system, for example, a network identity having network-wide quotas permitting printing of up to fifty pages could log onto three separate systems and print a fifty page file from each system after authentication at each system. Checking with the authority for resource consumption authorization at the time the resource is requested to be consumed allows, for this example, printing of the first fifty page file and then denies printing of the next two print requests because the appropriate network-wide quota for the network identity is updated after the first request for resource consumption is complete.

Figure 2:
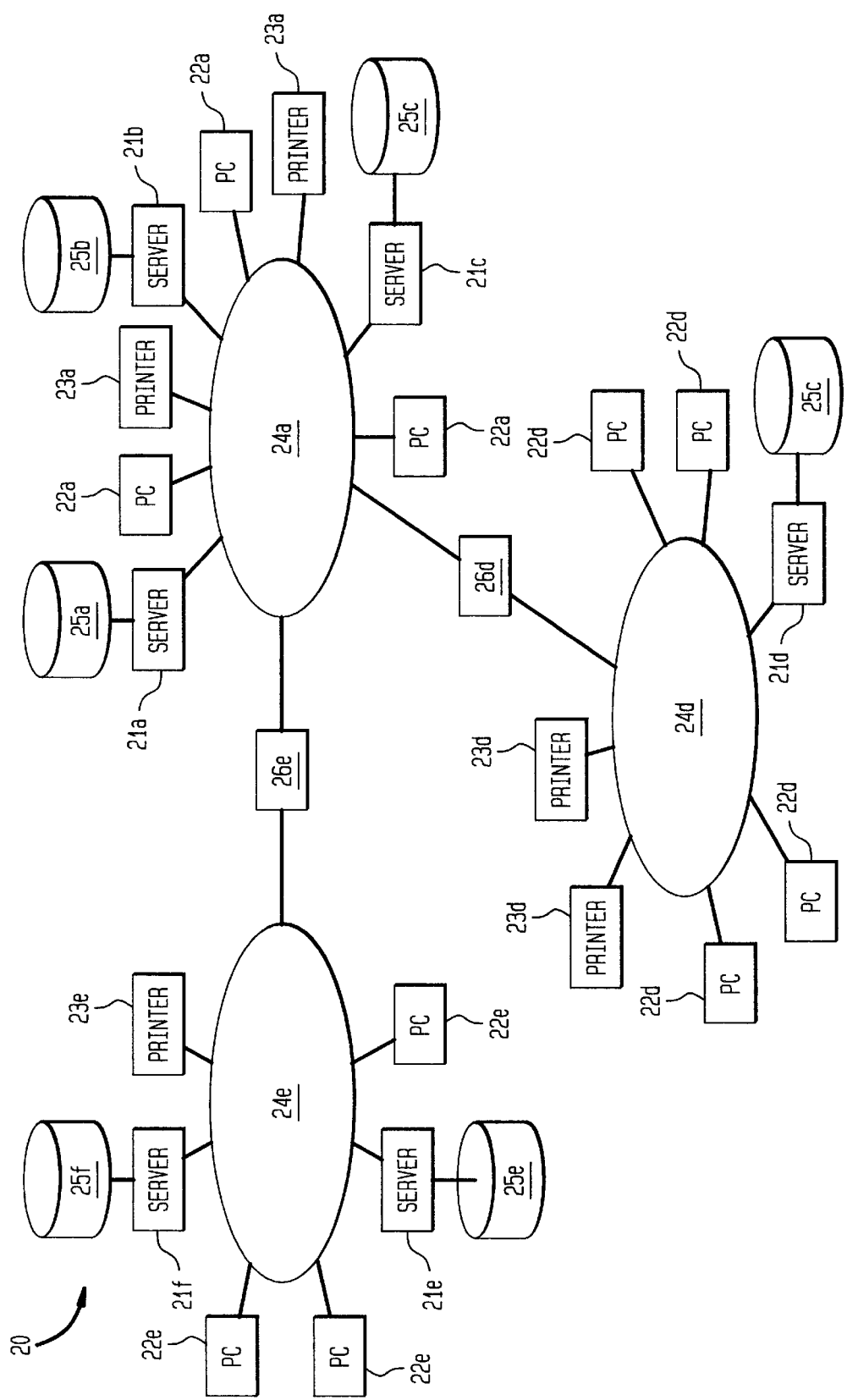
FIG. 2 shows a schematic block diagram of an illustrative LAN configured to connect together a plurality of other LANs.

As an illustrative example, the server computers 21a–21f in system 20, shown in FIG. 2, may be running under the control of the Advanced Server for UNIX Systems (AS/U) network operating system and a location containing the accounts database may be disk drive 25a. The accounts database includes a set of network-wide quotas for each network identity. Resource-specific quota information, such as limits on the number of pages that may be printed by a specific color printer, or limits on the amount of CPU time that may be consumed by a particular computer system connected to a system, may be included in either the accounts database, or on the system hosting the resource.

A user at a PC 22d may want to have a printout printed at printer 23d. At the time of the request, the accounts database in disk drive 25a is contacted for determining whether user identity for the user has not exceeded the limits imposed by a resource-specific quota for printer 23d. The network-wide maximum-use quota for the resource that is associated with the user is compared to a network-wide resource amount that is in-use by the user. If the limits are not exceeded, then the requested resource is allocated to the user for consumption and the information relating to network-wide resource amount that is in-use or consumed by the user identity is updated when the consumption is complete. If it is determined that the quota has been exceeded, the user is denied consumption of the resource.

Figure 5:
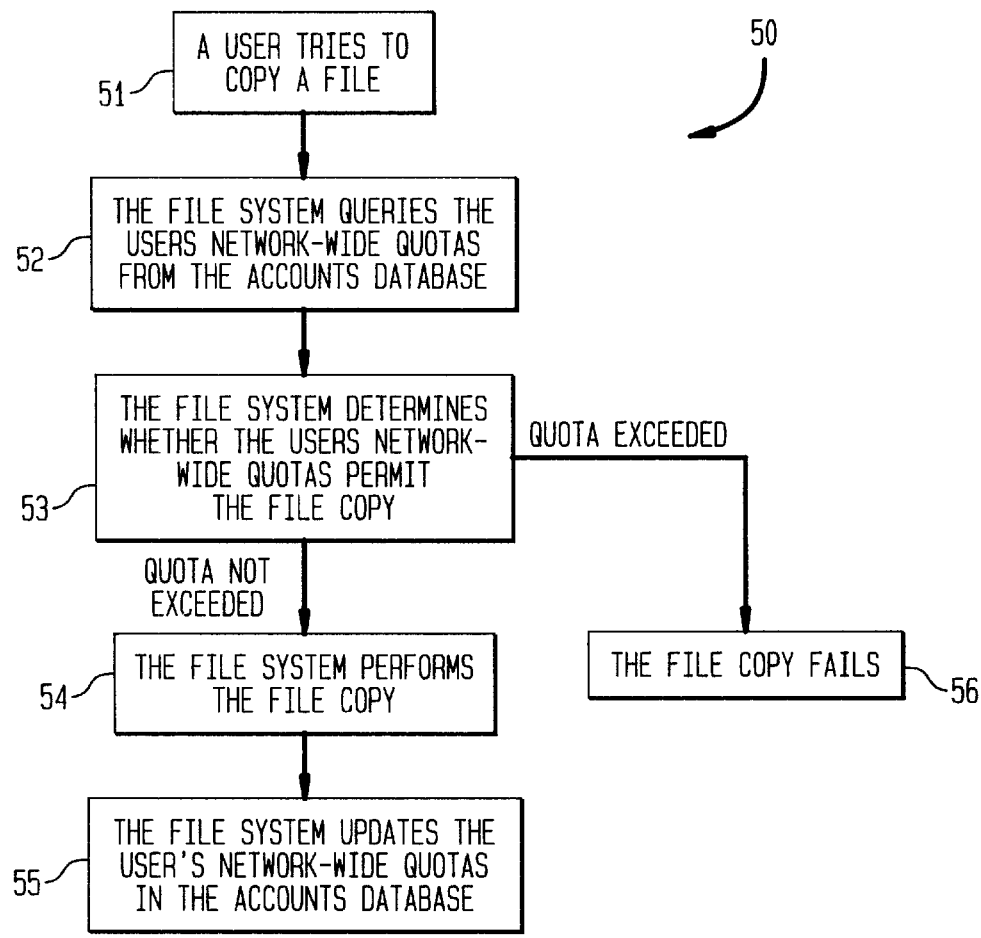
FIG. 5 shows a flow diagram illustrating control of resource usage according to the present invention.

FIG. 5 shows a flow diagram 50 illustrating control of resource usage according to the present invention. A user at a PC 22e desire consume disk storage space on disk drive 25e by copying a file at step 51. At step 52, the file system queries the accounts database for determining whether the resource request exceeds the storage quota assigned to the user identity for the user. If, at step 53, the storage quota has not been exceeded, the operation is authorized and the file is copied at step 54. The consumption information for the user identity is updated accordingly at step 55. If the storage quota has been exceeded at step 53, the consumption is denied and the operation fails at step 56.

Checking with an authority every time that a network identity requests consumption of a resource will likely produce a performance bottleneck in the system depending upon the system size and the number of users of the system. One way to avoid this bottleneck is for a network-wide quota for a network identity to contain a threshold indicating the quantity of a particular resource that must be requested and evaluated locally before triggering a check with the an authority. For example, one resource-specific threshold may indicate that a network identity may print up to ten pages at a specific printer, such as a color printer, before the central authority is contacted for authorization. Another resource-specific threshold may indicate that a network identity may print up to ten pages on any printer in the system before the central authority is contacted for authorization.

Another way to avoid system performance problems associated with frequent checking of resource usage with an authority is to pre-allocate resources. That is, if a process determines that up to 1 MB of disk space will be consumed on behalf of a network identity, the process could authorize consumption of the necessary memory space, use what was needed, and release the pre-allocated, yet unnecessary remaining space for allocation to another network identity.

Figure 6:
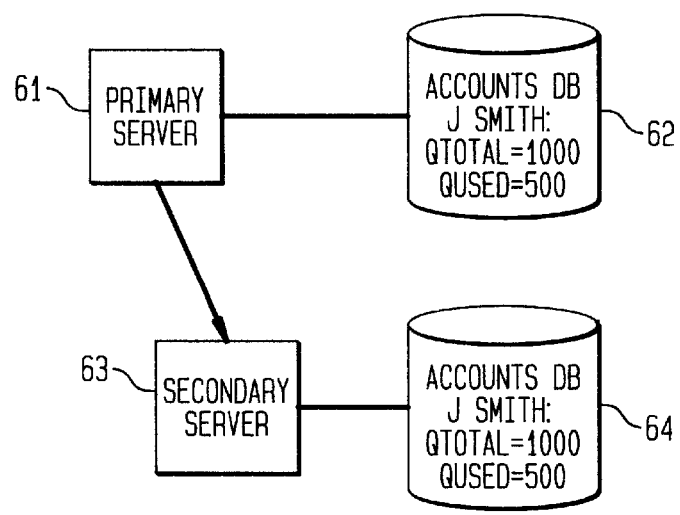
FIG. 6 shows a schematic block diagram illustrating replication of a database containing network-wide quotas according to the present invention.

Yet another way to avoid system performance bottlenecks caused by frequent requests to the authority for authorizing consumption is to have a plurality of databases distributed around system 20 that replicate the accounts database stored in disk drive 25a. FIG. 6 shows a schematic block diagram illustrating replication of a database containing network-wide quotas. Primary server 61 replicates the accounts database stored in disk drive 62 in secondary server 63 and disk drive 64.

When consumption of a resource is requested, the request is sent to an appropriate image of the accounts database where it is determined whether the consumption request should be fulfilled. Updates to individual network-wide quotas at the secondary databases are periodically sent to the primary network-wide quota data at disk drive 25a and then replicated at each of the plurality of secondary databases distributed around system 20.

While the present invention has been described in connection with the illustrated embodiments, it will be appreciated and understood that modifications may be made without departing from the true spirit and scope of the invention.

We claim:

1. A method for authorizing allocation of a resource of a computing system to a user, the computing system including a plurality of resources interconnected by a network, the method comprising the steps of:

comparing a network-wide maximum-use quota amount of the resource associated with a user to a network-wide resource amount in-use by the user; and authorizing on a network-wide basis allocation of an amount of the resource requested by the user based on when the requested amount of the resource and the network-wide resource amount in-use by the user together do not exceed the network-wide maximum-use quota amount of the resource associated with the user.

2. The method according to claim 1, wherein the step of comparing includes the steps of:

obtaining the network-wide maximum-use quota amount of the resource associated with the user from a first database; and obtaining the network-wide resource amount in-use by the user from a second database.

3. The method according to claim 2, further comprising the step of associating a predetermined network-wide maximum-use quota amount of the resource with the user.

4. The method according to claim 2, wherein selected resources form a subsystem of the computing system, and wherein the network-wide maximum-use quota amount associated with the user includes a maximum-use per-subsystem quota amount.

5. The method according to claim 2, wherein the resource includes at least one of disk usage, printer usage, virtual memory usage, network transmissions and mail messages sent.

6. The method according to claim 2, wherein the network-wide maximum-use quota amount includes at least one of a fixed block-type quota and an allowance-type quota.

7. The method according to claim 2, wherein the step of authorizing allocation of the requested amount of the resource includes the step of updating the network-wide amount of the resource in-use by the user after the requested amount of the resource is allocated.

8. The method according to claim 7, wherein the first and second databases are the same database.

9. The method according to claim 7, further comprising the step of receiving a request from the user for use of a requested amount of the resource.

10. The method according to claim 9, further comprising the steps of:

determining whether the requested amount of the resource exceeds a predetermined threshold; and sending the request on behalf of the user when the requested amount of the resource exceeds the predetermined threshold.

11. The method according to claim 7, wherein the step of comparing includes comparing a resource-specific maximum-use quota amount associated with the user for a specific resource of the computing system to a resource-specific in-use amount of the specific resource that is in-use by the user; and wherein the step of authorizing allocation of the requested amount of the resource is further based on when the requested amount of the specific resource and the resource-specific in-use amount of the specific resource that is in-use by the user together do not exceed the resource-specific maximum-use quota amount associated with the user for the specific resource.

12. The method according to claim 11, wherein the step of comparing the resource-specific maximum-use quota amount associated with the user for the specific resource to a resource-specific in-use amount of the specific resource that is in-use by the user includes the steps of:
   obtaining from a third database the resource-specific maximum-use quota amount associated with the user for the specific resource; and
   obtaining from a fourth database the resource-specific in-use amount of the specific resource that is in-use by the user.

13. The method according to claim 12, wherein the third and fourth databases are the same database.

14. The method according to claim 13, further comprising the step of associating a resource-specific maximum-use quota amount for the specific resource with the user.

15. A method for authorizing allocation of a resource of a plurality of resources of a computing system to a network identity on a network-wide basis, the computing system including a plurality of resources interconnected by a network, the plurality of resources including a plurality of computers N and including a plurality resource classes, the method comprising the steps of:
   assigning a network-wide quota q(i,r) to a network identity i for a resource class r;
   storing the assigned network-wide quota q(i,r) in a first database;
   storing a total usage c(i,r) of the resource class r by network identity i on a computer c in a second database, computer c being one of the plurality of computers N;
   obtaining the network-wide quota q(i,r) for the network identity i for resource class r from the first database;
   obtaining the total usage c(i,r) of the resource class r by network identity i on computer c from the second database; and
   authorizing allocation of a requested amount of resource class r based on when $$\sum_{c \in N} c(i, r) \leq q(i, r).$$

16. The method according to claim 15, wherein the first and second databases are the same database.

17. The method according to claim 15, further comprising the steps of:
   updating the total usage c(i,r) of the resource class r by network identity i on computer c with the requested amount of resource class r after the requested amount of the resource claim r is allocated; and
   storing the updated total usage c(i,r) in the second database.

18. The method according to claim 15, further comprising the steps of:
   determining whether the requested amount of resource class r exceeds a predetermined threshold; and
   sending the request from the network identity i at computer c for use of the requested amount of resource class r when the requested amount of resource r exceeds the predetermined threshold.

19. The method according to claim 18, further comprising the step of receiving a request from the network identity i at computer c for use of the requested amount of resource class r.

20. The method according to claim 19, wherein a resource d provides a specific resource in resource class r,
   wherein the request includes a request for an amount of the specific resource provided by the resource d;
   the method further comprising the steps of:
   assigning a resource-specific maximum-use quota m(i,d) for the network identity i and the resource d;
   storing the resource-specific maximum-use quota m(i,d) in a third database; and
   storing a total usage t(i,d) of the resource d by the network identity i in a fourth database; and
   wherein the step of authorizing allocation of the requested amount of the specific resource is further based on when $$t(i, d) < m(i, d).$$

21. The method according to claim 20, wherein before the step of authorizing allocation of the requested amount of the specific resource, the method further comprises the steps of:
   obtaining the resource-specific maximum-use quota m(i, d) from the third database; and
   obtaining the total usage t(i,d) of resource d by the network identity i from the fourth database.

22. The method according to claim 21, further comprising the steps of:
   updating the total usage t(i,d) of resource d by network identity i with the requested amount of the specific resource provided by the resource d when the requested amount of the specific resource is allocated; and
   storing the updated total usage t(i,d) in the fourth database.

23. The method according to claim 22, wherein the third and fourth databases are the same database.

24. The method according to claim 15, wherein a resource d provides a specific resource in resource class r,
   wherein the request includes a request for an amount of the specific resource provided by the resource d;
   the method further comprising the steps of:
   assigning a resource-specific maximum-use quota m(i, d) for the network identity i and the resource d;
   storing the resource-specific maximum-use quota m(i, d) in a third database; and
   storing a total usage t(i,d) of the resource d by the network identity i in a fourth database; and
   wherein the step of authorizing allocation of the requested specific resource is further based on when $$t(i, d) < m(i, d).$$

25. The method according to claim 24, wherein before the step of authorizing allocation of the requested amount of the specific resource, the method further comprises the steps of:
   obtaining the resource-specific maximum-use quota m(i, d) from the third database; and
   obtaining the total usage t(i,d) of resource d by the network identity i from the fourth database.

26. The method according to claim 25, further comprising the steps of:
   updating the total usage t(i,d) of resource d by network identity i with the requested amount of the specific resource provided by the resource d; and
   storing the updated total usage t(i,d) in the fourth database.

27. The method according to claim 26, wherein the third and fourth databases are the same database.

* * * * *